US012761448B2

(12) United States Patent
Liao et al.

(10) Patent No.: US 12,761,448 B2
(45) Date of Patent: Oct. 13, 2026

(54) OPTICAL LENS ASSEMBLY

(71) Applicant: NEWMAX TECHOLOGY CO., LTD., Taichung City (TW)

(72) Inventors: Chia-Wei Liao, Taichung City (TW); Ruei-Tze Hong, Taichung City (TW)

(73) Assignee: NEWMAX TECHNOLOGY CO., LTD., Taichung City (TW)

( * ) Notice: Subject to any disclaimer, the term of this patent is extended or adjusted under 35 U.S.C. 154(b) by 304 days.

(21) Appl. No.: 18/427,518

(22) Filed: Jan. 30, 2024

(65) Prior Publication Data

US 2025/0172786 A1 May 29, 2025

(30) Foreign Application Priority Data

Nov. 24, 2023 (TW) ................................ 112145582

(51) Int. Cl.
*G02B 9/64* (2006.01)
*G02B 7/02* (2021.01)
*G02B 13/00* (2006.01)

(52) U.S. Cl.
CPC ............... *G02B 9/64* (2013.01); *G02B 7/021* (2013.01); *G02B 13/0045* (2013.01)

(58) Field of Classification Search
None
See application file for complete search history.

(56) References Cited

U.S. PATENT DOCUMENTS

| | | | | |
|---|---|---|---|---|
| 2019/0339490 | A1* | 11/2019 | Tseng | G02B 13/04 |
| 2020/0057268 | A1* | 2/2020 | Chen | G02B 13/0045 |
| 2021/0041664 | A1* | 2/2021 | Wang | G02B 9/62 |
| 2022/0050272 | A1* | 2/2022 | Lin | G02B 13/0045 |
| 2022/0066144 | A1* | 3/2022 | Liao | G02B 13/04 |
| 2023/0063978 | A1* | 3/2023 | Tsai | G02B 13/0045 |
| 2023/0161137 | A1* | 5/2023 | Tsai | G02B 13/0045 359/755 |
| 2023/0204915 | A1* | 6/2023 | Lin | G02B 9/64 359/692 |
| 2024/0094507 | A1* | 3/2024 | Lee | G02B 13/18 |

* cited by examiner

*Primary Examiner* — Darryl J Collins
(74) *Attorney, Agent, or Firm* — Juan Carlos A. Marquez; Marquez IP Law Office, PLLC

(57) ABSTRACT

An optical lens assembly includes a stop, and includes, in order from the object side to the image side: a first lens, a second lens, a third lens, a fourth lens, a fifth lens, and a sixth lens; wherein a maximum field of view of the optical lens assembly is FOV, an entrance pupil diameter of the optical lens assembly is EPD, and the following condition is satisfied: 254.30<FOV*EPD<418.64.

19 Claims, 5 Drawing Sheets

OPTICAL LENS ASSEMBLY

CROSS-REFERENCE TO RELATED APPLICATION

This application claims the benefit of Taiwan Patent Application No. 112145582, filed on Nov. 24, 2023, which is hereby incorporated by reference for all purposes as if fully set forth herein.

BACKGROUND

Technical Field

The present disclosure relates to an optical lens assembly, and in particular, to an optical lens assembly applicable to an electronic device.

Related Art

According to the rapid development of time-of-flight (TOF) technology for smart devices such as sweeping robots, VR/AR, and autonomous driving, we urgently need an innovative lens module. The key features of this new lens module include large aperture, large image height and high resolution to improve the performance and enable more accurate scene modeling. However, the existing technology has obvious limitations in the application of time-of-flight (TOF) technology, especially the need for miniaturization of the size of the lens module. Although reducing the size of the lens module is helpful for some applications, it will also cause the length of the lens module to be limited, thereby affecting the aperture size, and further affecting the light collection rate and performance of the time-of-flight (TOF) technology. This is an urgent problem in this technical field that needs to be solved.

SUMMARY

An objective of the present disclosure is to resolve the above problems of the prior art. In order to achieve the above objective, the present disclosure provides an optical lens assembly comprising a stop, and in order from an object side to an image side, comprising: a first lens with refractive power; a second lens with negative refractive power, comprising an object-side surface and an image-side surface, wherein at least one of the object-side surface and the image-side surface of the second lens is aspheric; a third lens with refractive power, comprising an object-side surface and an image-side surface, wherein the object-side surface of the third lens is convex near the optical axis; a fourth lens with refractive power, comprising an object-side surface and an image-side surface, wherein the object-side surface of the fourth lens is convex near the optical axis; a fifth lens with refractive power, comprising an object-side surface and an image-side surface, wherein at least one of the object-side surface and the image-side surface of the fifth lens is aspheric; and a sixth lens with refractive power, comprising an object-side surface and an image-side surface, wherein the object-side surface of the sixth lens is convex near the optical axis, the image-side surface of the sixth lens is concave near the optical axis, and at least one of the object-side surface and the image-side surface of the sixth lens is aspheric.

A total quantity of lenses with refractive power in the optical lens assembly is six. A maximum field of view of the optical lens assembly is FOV, an entrance pupil diameter of the optical lens assembly is EPD, a distance from an object-side surface of the first lens to an image plane along the optical axis is TL, a maximum image height of the optical lens assembly is IMH, an incident angle where a chief ray is incident on an image plane at a maximum view angle of the optical lens assembly is CRA, a distance from the image-side surface of the fifth lens to the image plane along the optical axis is BFL, a sum of the distances between any two adjacent lenses along the optical axis is ΣAT, a focal length of the optical lens assembly is f, a focal length of the first lens is f1, a focal length of the second lens is f2, a focal length of the third lens is f3, a focal length of the sixth lens is f6, a central thickness of the first lens along the optical axis is CT1, a central thickness of the second lens along the optical axis is CT2, a central thickness of the third lens along the optical axis is CT3, a central thickness of the fourth lens along the optical axis is CT4, a central thickness of the fifth lens along the optical axis is CT5, a central thickness of the sixth lens along the optical axis is CT6, a distance from the image-side surface of the first lens to the object-side surface of the second lens along the optical axis is T12, a distance from the image-side surface of the third lens to the object-side surface of the fourth lens along the optical axis is T34, a distance from the image-side surface of the fourth lens to the object-side surface of the fifth lens along the optical axis is T45, a distance from the image-side surface of the second lens to the stop along the optical axis is T2S, a curvature radius of the object-side surface of the first lens is R1, a curvature radius of the image-side surface of the first lens is R2, a curvature radius of the object-side surface of the third lens is R5, a curvature radius of the image-side surface of the third lens is R6, a curvature radius of the image-side surface of the fourth lens is R8, a curvature radius of the object-side surface of the fifth lens is R9, a curvature radius of the object-side surface of the sixth lens is R11, and at least one condition is satisfied as follows:

$$254.30°*\text{mm} < FOV*EPD < 418.64°*\text{mm};$$

$$2.73 < TL/IMH < 4.39;$$

$$1.52 < (CT3+CT6)/T34 < 29.60;$$

$$-40.49 < (R5*R6)/(f3*CT3) < -10.00;$$

$$0.18\text{ mm} < T45/(R8/R9) < 7.86\text{ mm};$$

$$4.79° < (CRA*EPD)/TL < 9.53°;$$

$$-3.90\text{ mm} < (CT6*f6)/f < 532.11\text{ mm};$$

$$2.52\text{ mm} < (IMH*R2)/EPD < 4.43\text{ mm};$$

$$4.88\text{ mm} < (R1/R2)*EPD < 10.44\text{ mm};$$

$$4.85°/\text{mm} < FOV/TL < 8.33°/\text{mm};$$

$$2.58\text{ mm} < TL*(CT1/T12) < 4.26\text{ mm};$$

$$4.56 < TL/BFL < 9.00;$$

$$1.71°/\text{mm}^2 < CRA/(BFL*f) < 4.56°/\text{mm}^2;$$

$$44.61° < \sum AT*CRA/BFL < 105.44°;$$

$$0.60 < f2/f1 < 26.76;$$

$$1.41 < R1/R2 < 2.98;$$

$$1.62\text{ mm} < (f3*CT3)/f < 2.90\text{ mm};$$

$$1.06 < f/R11 < 2.03;$$

-continued $$0.83 < (CT1 + T12 + CT2 + T2S)/EPD < 1.59;$$

$$2.37 < (CT3 + CT4 + CT5)/(CT1 + CT2) < 5.08;$$

$$-17.13\ \text{mm} < f1 < -8.28\ \text{mm};$$

and $$86.41° < FOV < 102.09°.$$

When the optical lens assembly satisfies the conditions of 254.30° *mm<FOV*EPD<418.64° *mm, in this way, the optical lens assembly has wide angle and captures much light.

When the optical lens assembly satisfies the conditions of 2.73<TL/IMH<4.39, by using this appropriate design, the lens height of the optical lens assembly is shorter and the image size is larger, which is beneficial to balancing the image quality and the size of the optical lens assembly.

When the optical lens assembly satisfies the conditions of 1.52<(CT3+CT6)/T34<29.60, in this way, the configuration of appropriate lens thickness and lens separation distance helps to reduce the sensitivity of the lens, reduce assembly tolerances, and improve the quality of the optical lens assembly.

When the optical lens assembly satisfies the conditions of −40.49< (R5*R6)/(f3*CT3)<−10.00, in this way, proper configuration can reduce the sensitivity of the lens and improve image quality.

When the optical lens assembly satisfies the conditions of 0.18 mm<T45/(R8/R9)<7.86 mm, in this way, proper configuration of the lens spacing and lens curvature can reduce the ghost reflection problem of the optical lens assembly.

When the optical lens assembly satisfies the conditions of 4.79°<(CRA*EPD)/TL<9.53°, in this way, the optical lens assembly meets the chief ray angle (CRA) requirements of the lens module according to the configuration of a short lens height.

When the optical lens assembly satisfies the conditions of −3.90 mm<(CT6*f6)/f<532.11 mm, in this way, the lens thickness, lens bending force and image height of the optical lens assembly can be configured more appropriately to achieve the best image quality.

When the optical lens assembly satisfies the conditions of 2.52 mm<(IMH*R2)/EPD<4.43 mm, by appropriately configuring the curvature of the image-side surface of the first lens, wide-angle characteristics are achieved to provide a larger viewing angle while maintaining the image quality of the optical lens assembly.

When the optical lens assembly satisfies the conditions of 4.88 mm<(R1/R2)*EPD<10.44 mm, in this way, the proper configuration of the ratio of the lens curvature to the entrance pupil diameter can effectively reduce the temperature drift caused by temperature changes to ensure excellent image quality.

When the optical lens assembly satisfies the conditions of 4.85°/mm<FOV/TL<8.33°/mm, in this way, the configuration of the optical lens assembly is more appropriate, thereby achieving a miniaturized optical lens assembly and meeting the wide-angle effect.

When the optical lens assembly satisfies the conditions of 2.58 mm<TL*(CT1/T12)<4.26 mm, in this way, proper configuration can effectively enhance its wide-angle characteristics and provide a larger viewing angle, which is beneficial to improving the image quality of the optical lens assembly.

When the optical lens assembly satisfies the conditions of 4.56<TL/BFL<9.00, in this way, a suitable lens space can be provided to facilitate miniaturization and a suitable back focus length.

When the optical lens assembly satisfies the conditions of 1.71°/mm$^2$<CRA/(BFL*f)<4.56 m°/mm$^2$, in this way, the incident angle of the chief ray and the overall focal length of the optical lens assembly are optimally configured, so that the optical lens assembly has better relative illumination and meets the back focus length requirement of the optical lens assembly.

When the optical lens assembly satisfies the conditions of 44.61°<ΣAT*CRA/BFL<105.44°, in this way, the configuration of the lens spacing and back focal length of the optical lens assembly is more appropriate to meet the incident angle requirements of the chief ray.

When the optical lens assembly satisfies the conditions of 0.60<f2/f1<26.76, in this way, the configuration of the lens refractive power and lens thickness of the optical lens assembly is more appropriate, which is beneficial to correcting aberrations of the optical lens assembly to improve image quality.

When the optical lens assembly satisfies the conditions of 1.41<R1/R2<2.98, in this way, the appropriate configuration of the lens curvature can effectively enhance its wide-angle characteristics and provide a larger viewing angle, which is beneficial to improving the image quality of the optical lens assembly.

When the optical lens assembly satisfies the conditions of 1.62 mm<(f3*CT3)/f<2.90 mm, in this way, the proper configuration of the lens refractive power and lens thickness can effectively reduce the temperature drift caused by temperature changes to ensure excellent image quality.

When the optical lens assembly satisfies the conditions of 1.06<f/R11<2.03, in this way, the configuration of back focus length of the optical lens assembly is more appropriate.

When the optical lens assembly satisfies the conditions of 0.83<(CT1+T12+CT2+T2S)/EPD<1.59, in this way, a larger image height is provided to achieve the best image quality.

When the optical lens assembly satisfies the conditions of 2.37< (CT3+CT4+CT5)/(CT1+CT2)<5.08, in this way, the lens combination of the imaging lens group is more appropriate and helps to achieve a balance between miniaturization and performance of the optical lens assembly.

When the optical lens assembly satisfies the conditions of −17.13 mm<f1<−8.28 mm, in this way, the lens combination of the optical lens assembly is more appropriate and helps to achieve a balance between miniaturization and performance of the optical lens assembly.

When the optical lens assembly satisfies the conditions of 86.41°<FOV<102.09°, in this way, the lens refractive power of the optical lens assembly has a better configuration.

DETAILED DESCRIPTION

In order to enable a person of ordinary skill in the art to understand and realize the contents of the present disclosure, the following are illustrated by proper embodiments with accompanying drawings, and the equivalent substitutions and modifications based on the contents of the present disclosure are included in the scope of the present disclosure. It is also stated that the accompanying drawings of the present disclosure are not depictions of actual dimensions, and although the present disclosure provides embodiments of particular parameters, it is to be understood that the parameters need not be exactly equal to their corresponding values, and that, within an acceptable margin of error, are approximate to their corresponding parameters. The following embodiments will further detail the technical aspects of the present disclosure, but the disclosure is not intended to limit the scope of the present disclosure.

First Embodiment

Figure 1A:
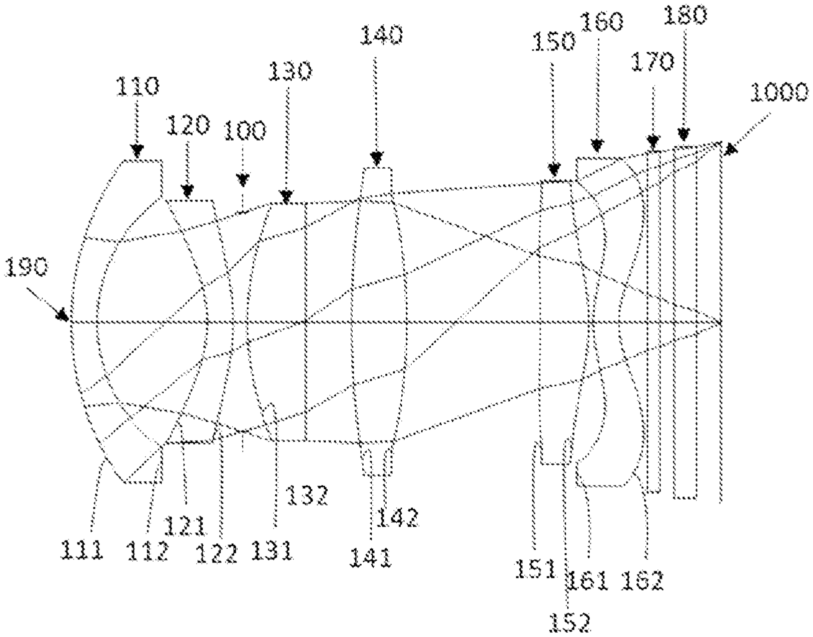
FIG. 1A is a schematic view of an optical lens assembly according to a first embodiment of the present disclosure.
Figure 1B:
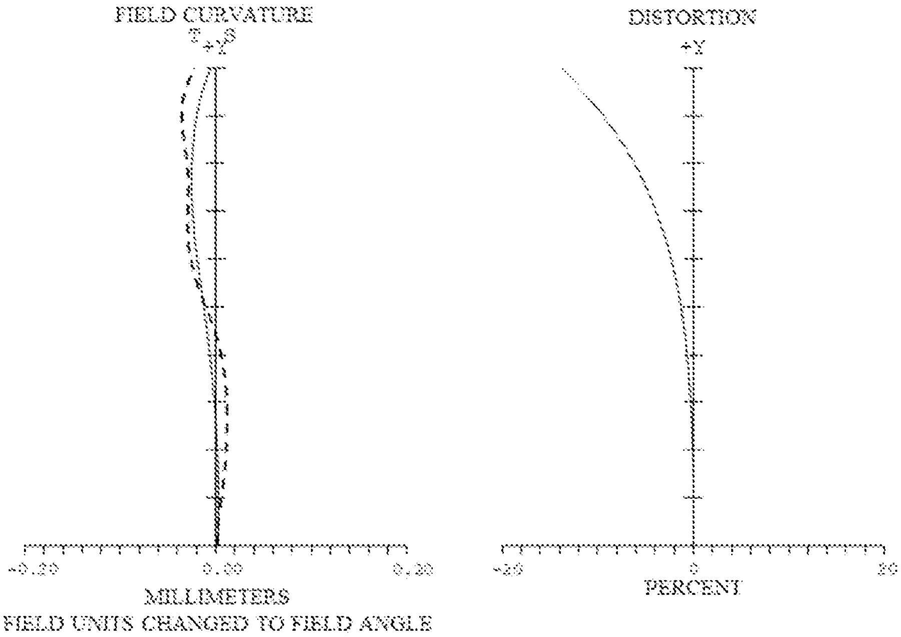
FIG. 1B sequentially shows a field curvature curve and a distortion curve of an optical lens assembly according to a first embodiment.

Refer to FIG. 1A and FIG. 1B. FIG. 1A is a schematic view of an optical lens assembly according to a first embodiment of the present disclosure, and FIG. 1B shows a field curvature curve and a distortion curve of an optical lens assembly according to a first embodiment. As be seen from FIG. 1A, the optical lens assembly includes, in order from an object side to an image side: a first lens 110, a second lens 120, a stop 100, a third lens 130, a fourth lens 140, a fifth lens 150, a sixth lens 160, an IR bandpass filter 170, a cover glass 180 and an image plane 1000. A total quantity of lenses with refractive power in the optical lens assembly is six, but not limited thereto.

The first lens 110 with negative refractive power is made of a glass material and includes an object-side surface 111 and an image-side surface 112, wherein the object-side surface 111 of the first lens 110 is convex near an optical axis 190, and the image-side surface 112 of the first lens 110 is concave near the optical axis 190. The object-side surface 111 and the image-side surface 112 are spherical.

The second lens 120 with negative refractive power is made of a plastic material and includes an object-side surface 121 and an image-side surface 122, wherein the object-side surface 121 of the second lens 120 is concave near the optical axis 190, and the image-side surface 122 of the second lens 120 is convex near the optical axis 190. The object-side surface 121 and the image-side surface 122 are aspheric.

The third lens 130 with positive refractive power is made of a plastic material and includes an object-side surface 131 and an image-side surface 132, wherein the object-side surface 131 of the third lens 130 is convex near an optical axis 190, and the image-side surface 132 of the third lens 130 is convex near the optical axis 190. The object-side surface 131 and the image-side surface 132 are aspheric.

The fourth lens 140 with positive refractive power is made of a glass material and includes an object-side surface 141 and an image-side surface 142, wherein the object-side surface 141 of the fourth lens 140 is convex near an optical axis 190, and the image-side surface 142 of the fourth lens 140 is convex near the optical axis 190. The object-side surface 141 and the image-side surface 142 are spherical.

The fifth lens 150 with positive refractive power is made of a plastic material and includes an object-side surface 151 and an image-side surface 152, wherein the object-side surface 151 of the fifth lens 150 is concave near the optical axis 190, and the image-side surface 152 of the fifth lens 150 is convex near the optical axis 190. The object-side surface 151 and the image-side surface 152 are aspheric.

The sixth lens 160 with negative refractive power is made of a plastic material and includes an object-side surface 161 and an image-side surface 162, wherein the object-side surface 161 of the sixth lens 160 is convex near the optical axis 190, and the image-side surface 162 of the sixth lens 160 is concave near the optical axis 190. The object-side surface 161 and the image-side surface 162 are aspheric.

The IR bandpass filter 170 is made of glass, and is disposed between the sixth lens 160 and the image plane 1000 without affecting a focal length of the optical lens assembly. It can be understood that, the IR bandpass filter 170 may also be formed on the surface of the above-mentioned lens. The IR bandpass filter 170 may also be made of other materials.

The cover glass 180 is made of glass and is disposed between the IR bandpass filter 170 and the image plane 1000 without affecting the focal length of the optical lens assembly. The cover glass 180 is used to protect the sensing element (not shown).

An aspheric curve equation of the above-mentioned lenses is expressed as follows:

$$z(h)=\frac{ch^2}{1+\left[1-(k+1)c^2h^2\right]^{0.5}}+\sum(A_i)\cdot(h^i)$$

wherein, z is a position value in the direction of the optical axis 190 and with a surface vertex as a reference at a position of a height h; c is a curvature of a lens surface near the optical axis 190, and is a reciprocal of a curvature radius (R) (c=1/R), R is a curvature radius of a lens surface near the optical axis 190, h is a vertical distance between the lens surface and the optical axis 190, k is a conic constant, and Ai is an $i^{th}$ order aspheric coefficient.

In the first embodiment, a focal length of the optical lens assembly is f, an f-number of the optical lens assembly is Fno, and a maximum field of view in the optical lens assembly is FOV, and values are as follows: f=4.72 (millimeters), Fno=1.25, and FOV=92.44°.

In the optical lens assembly of the first embodiment, a maximum field of view of the optical lens assembly is FOV, an entrance pupil diameter of the optical lens assembly is EPD, and the following condition is satisfied: FOV*EPD=348.87°*mm.

In the optical lens assembly of the first embodiment, a distance from an object-side surface of the first lens to an image plane along the optical axis is TL, a maximum image height of the optical lens assembly is IMH, and the following condition is satisfied: TL/IMH=3.61.

In the optical lens assembly of the first embodiment, a central thickness of the third lens along the optical axis is CT3, a central thickness of the sixth lens along the optical axis is CT6, a distance from the image-side surface of the third lens to the object-side surface of the fourth lens along the optical axis is T34, and the following condition is satisfied: (CT3+CT6)/T34=1.89.

In the optical lens assembly of the first embodiment, a curvature radius of the object-side surface of the third lens is R5, a curvature radius of the image-side surface of the third lens is R6, a focal length of the third lens is f3, a central thickness of the third lens along the optical axis is CT3, and the following condition is satisfied: (R5*R6)/(f3*CT3)=−32.57.

In the optical lens assembly of the first embodiment, a distance from the image-side surface of the fourth lens to the object-side surface of the fifth lens along the optical axis is T45, a curvature radius of the image-side surface of the fourth lens is R8, a curvature radius of the object-side surface of the fifth lens is R9, and the following condition is satisfied: T45/(R8/R9)=4.55 mm.

In the optical lens assembly of the first embodiment, an incident angle where a chief ray is incident on an image plane at a maximum view angle of the optical lens assembly is CRA, a distance from the object-side surface of the first lens to the image plane along the optical axis is TL, and the following condition is satisfied: (CRA*EPD)/TL=5.99°

In the optical lens assembly of the first embodiment, a central thickness of the sixth lens along the optical axis is CT6, a focal length of the sixth lens is f6, a focal length of the optical lens assembly is f, and the following condition is satisfied: (CT6*f6)/f=−1.51 mm.

In the optical lens assembly of the first embodiment, a maximum image height of the optical lens assembly is IMH, a curvature radius of the image-side surface of the first lens is R2, and the following condition is satisfied: (IMH*R2)/EPD=3.69 mm.

In the optical lens assembly of the first embodiment, a curvature radius of the object-side surface of the first lens is R1, a curvature radius of the image-side surface of the first lens is R2, and the following condition is satisfied: (R1/R2)*EPD=6.72 mm.

In the optical lens assembly of the first embodiment, a distance from the object-side surface of the first lens to the image plane along the optical axis is TL, and the following condition is satisfied: FOV/TL=6.16°/mm.

In the optical lens assembly of the first embodiment, a distance from the object-side surface of the first lens to the image plane along the optical axis is TL, a central thickness of the first lens along the optical axis is CT1, a distance from the image-side surface of the first lens to the object-side surface of the second lens along the optical axis is T12, and the following condition is satisfied: TL*(CT1/T12)=3.55 mm In the optical lens assembly of the first embodiment, a distance from the object-side surface of the first lens to the image plane along the optical axis is TL, a distance from the image-side surface of the fifth lens to the image plane along the optical axis is BFL, and the following condition is satisfied: TL/BFL=6.35.

In the optical lens assembly of the first embodiment, an incident angle where a chief ray is incident on an image plane at a maximum view angle of the optical lens assembly is CRA, a distance from the image-side surface of the fifth lens to the image plane along the optical axis is BFL, a focal length of the optical lens assembly is f, and the following condition is satisfied: CRA/(BFL*f)=2.14°/$mm^2$.

In the optical lens assembly of the first embodiment, a sum of the distances between any two adjacent lenses along the optical axis is ΣAT, an incident angle where a chief ray is incident on an image plane at a maximum view angle of the optical lens assembly is CRA, a distance from the image-side surface of the fifth lens to the image plane along the optical axis is BFL, and the following condition is satisfied: ΣAT*CRA/BFL=71.25°.

In the optical lens assembly of the first embodiment, a focal length of the first lens is f1, a focal length of the second lens is f2, and the following condition is satisfied: f2/f1=0.76.

In the optical lens assembly of the first embodiment, a curvature radius of the object-side surface of the first lens is R1, a curvature radius of the image-side surface of the first lens is R2, and the following condition is satisfied: R1/R2=1.78;

In the optical lens assembly of the first embodiment, a focal length of the optical lens assembly is f, a focal length of the third lens is f3, a central thickness of the third lens along the optical axis is CT3, and the following condition is satisfied: (f3*CT3)/f=2.42 mm;

In the optical lens assembly of the first embodiment, a focal length of the optical lens assembly is f, a curvature radius of the object-side surface of the sixth lens is R11, and the following condition is satisfied: f/R11=1.66;

In the optical lens assembly of the first embodiment, a central thickness of the first lens along the optical axis is CT1, a central thickness of the second lens along the optical axis is CT2, a distance from the image-side surface of the first lens to the object-side surface of the second lens along the optical axis is T12, a distance from the image-side surface of the second lens to the stop along the optical axis is T2S, and the following condition is satisfied: (CT1+T12+CT2+T2S)/EPD=1.04; and In the optical lens assembly of the first embodiment, a focal length of the first lens is f1, and the following condition is satisfied: (CT3+CT4+CT5)/(CT1+CT2)=3.14.

Refer to Table 1 and Table 2 below.

TABLE 1

First embodiment
f (focal length) = 4.72 mm (millimeters), Fno (f-number) = 1.25,
FOV (field of view) = 92.44° (degrees)

| Surface | | Curvature radius (mm) | Central thickness/ gap (mm) | Material | Refractive index (nd) | Abbe number (vd) | Focal length (mm) |
|---|---|---|---|---|---|---|---|
| 0 | Object | Infinity | Infinity | | | | |
| 1 | First lens | 5.982 | 0.600 | Glass | 1.52 | 64.20 | −16.32 |

TABLE 1-continued

First embodiment
f (focal length) = 4.72 mm (millimeters), Fno (f-number) = 1.25,
FOV (field of view) = 92.44° (degrees)

| Surface | | Curvature radius (mm) | Central thickness/ gap (mm) | Material | Refractive index (nd) | Abbe number (vd) | Focal length (mm) |
|---|---|---|---|---|---|---|---|
| 2 | | 3.358 | 2.536 | | | | |
| 3 | Second lens | −2.530 (ASP) | 0.600 | Plastic | 1.66 | 20.37 | −12.32 |
| 4 | | −4.082 (ASP) | 0.202 | | | | |
| 5 | Stop | Infinity | 0.100 | | | | |
| 6 | Third lens | 19.144 (ASP) | 1.270 | Plastic | 1.66 | 20.37 | −12.32 |
| 7 | | −11.886 (ASP) | 3.092 | | | | |
| 8 | Fourth lens | 19.144 | 1.270 | Glass | 2.00 | 28.32 | 7.70 |
| 9 | | −11.886 | 3.092 | | | | |
| 10 | Fifth lens | −17.493 (ASP) | 1.116 | Plastic | 1.64 | 23.97 | 9.59 |
| 11 | | −4.508 (ASP) | 0.100 | | | | |
| 12 | Sixth lens | 2.833 (ASP) | 0.600 | Plastic | 1.66 | 20.37 | −11.90 |
| 13 | | 1.892 (ASP) | 0.663 | | | | |
| 14 | IR bandpass filter | Infinity | 0.300 | Glass | 1.52 | 64.17 | |
| 15 | | Infinity | 0.316 | | | | |
| 16 | Cover Glass | Infinity | 0.500 | Glass | 1.52 | 64.17 | |
| 17 | | Infinity | 0.584 | | | | |
| 18 | Image Plane | Infinity | | | | | |

Reference wavelength 940 nm

TABLE 2

Aspheric coefficient

| Surface | 3 | 4 | 6 | 7 |
|---|---|---|---|---|
| K: | −4.3619E+00 | −8.6649E+00 | 0.0000E+00 | 0.0000E+00 |
| A2: | 0.0000E+00 | 0.0000E+00 | 0.0000E+00 | 0.0000E+00 |
| A4: | −1.8977E−03 | 3.1027E−03 | −3.4695E−03 | 0.0000E+00 |
| A6: | 7.0651E−04 | −4.3978E−04 | 1.3765E−04 | 1.9012E−04 |
| A8: | −2.1635E−04 | 4.0331E−05 | 3.7233E−05 | −2.0392E−05 |
| A10: | 3.7355E−05 | 2.5307E−06 | −8.2216E−06 | 2.5426E−06 |
| A12: | −3.4845E−06 | −9.5974E−07 | 7.2332E−07 | −1.9374E−07 |
| A14: | 1.3531E−07 | 6.4188E−08 | −2.0721E−08 | 1.1696E−08 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |

| Surface | 10 | 11 | 12 | 13 |
|---|---|---|---|---|
| K: | 0.0000E+00 | −1.3634E+01 | −1.3201E+00 | −3.2100E+00 |
| A2: | 0.0000E+00 | 0.0000E+00 | 0.0000E+00 | 0.0000E+00 |
| A4: | 1.0717E−02 | 2.8044E−03 | −3.2373E−02 | −1.8938E−02 |
| A6: | −1.9067E−03 | −4.1005E−04 | 1.4793E−03 | 1.6254E−03 |
| A8: | 2.3752E−04 | 2.7503E−05 | 1.2696E−04 | −9.5913E−05 |
| A10: | −1.4811E−05 | 9.8305E−06 | −3.3163E−05 | 2.2134E−06 |
| A12: | 2.8008E−07 | −1.3623E−06 | 2.8737E−06 | 1.7224E−08 |
| A14: | −2.4535E−09 | 4.0718E−08 | −1.0965E−07 | −1.9986E−09 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |

Table 1 shows detailed configuration data of the first embodiment in FIG. 1A. Units of the curvature radius, the central thickness, the gap, and the focal length is mm. Surfaces 0 to 18 sequentially represent surfaces from an object side to an image side. Surface 5 is a gap between the stop 100 and the object-side surface 131 of the third lens 130 along the optical axis 190. The stop 100 is closer to the object side than the object-side surface 131 of the third lens 130, and therefore the stop 100 is represented by a positive value. Otherwise, if the object-side surface 131 of the third lens 130 is closer to the object side than the stop 100, the stop 100 is represented by a negative value. Surfaces 1, 3, 6, 8, 10, 12, 14 and 16 are respectively central thicknesses of the first lens 110, the second lens 120, the third lens 130, the fourth lens 140, the fifth lens 150, the sixth lens 160, the IR bandpass filter 170 and the cover glass 180 along the optical axis 190. Surfaces 2, 4, 7, 9, 11, 13, 15 and 17 respectively are a gap between the first lens 110 and the second lens 120 along the optical axis 190, a gap between the second lens 120 and the stop 100 along the optical axis 190, a gap between the third lens 130 and the fourth lens 140 along the optical axis 190, a gap between the fourth lens 140 and the fifth lens 150 along the optical axis 190, a gap between the fifth lens 150 and the sixth lens 160 along the optical axis 190, a gap between the sixth lens 160 and the IR bandpass filter 170 along the optical axis 190, a gap between the IR bandpass filter 170 and the cover glass 180 along the optical axis 190, and a gap between and the cover glass 180 and the image plane 1000 along the optical axis 190.

Table 2 shows aspheric data in the first embodiment. k represents a conic constant in an aspheric curve equation, and A2, A4, A6, A8, A10, A12, A14, A16, A18, A20, A22 and A24 are high-order aspheric coefficients. In addition, the following tables of embodiments are schematic diagrams and aberration curves corresponding to the embodiments. The definitions of data in the tables of the embodiments are the same as the definitions in Table 1 and Table 2 of the first embodiment, and are not repeated herein.

Second Embodiment

Figure 2A:
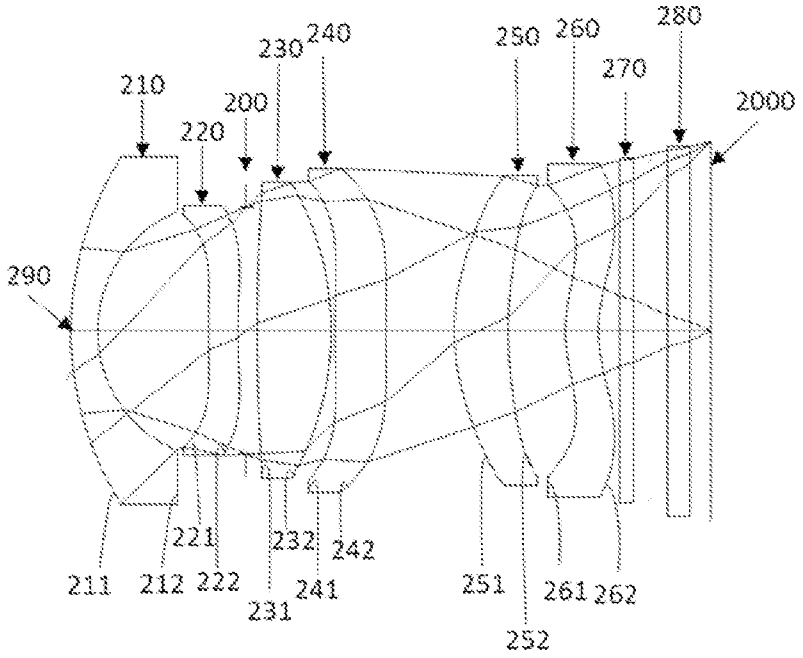
FIG. 2A is a schematic view of an optical lens assembly according to a second embodiment of the present disclosure.
Figure 2B:
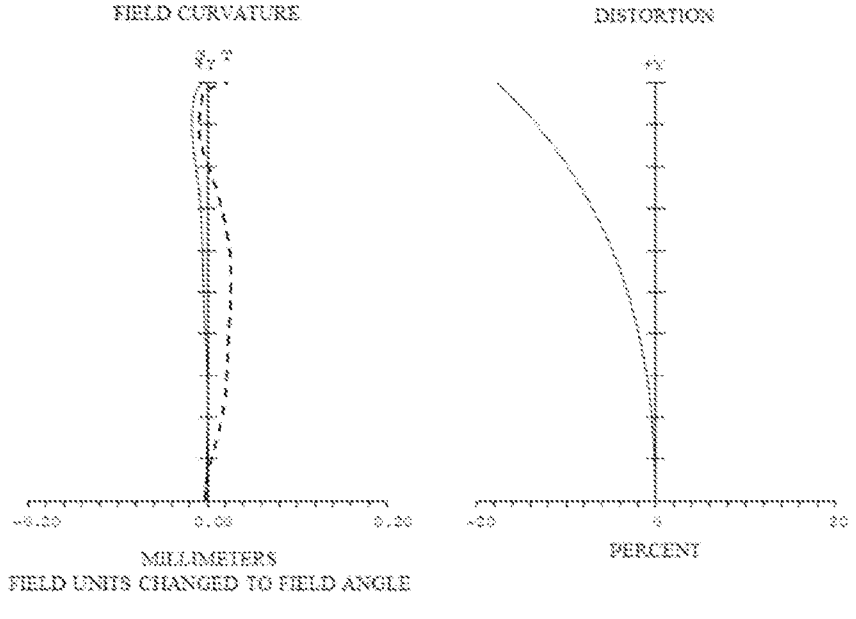
FIG. 2B sequentially shows a field curvature curve and a distortion curve of an optical lens assembly according to a second embodiment.

Refer to FIG. 2A and FIG. 2B. FIG. 2A is a schematic view of an optical lens assembly according to a second embodiment of the present disclosure, and FIG. 2B shows a field curvature curve and a distortion curve of an optical lens assembly according to a second embodiment. As can be seen from FIG. 2A, the optical lens assembly includes, in order from an object side to an image side: a first lens 210, a second lens 220, a stop 200, a third lens 230, a fourth lens 240, a fifth lens 250, a sixth lens 260, an IR bandpass filter 270, a cover glass 280 and an image plane 2000. A total quantity of lenses with refractive power in the optical lens assembly is six, but not limited thereto.

The first lens 210 with negative refractive power is made of a glass material and includes an object-side surface 211 and an image-side surface 212, wherein the object-side surface 211 of the first lens 210 is convex near an optical axis 290, and the image-side surface 212 of the first lens 210 is concave near the optical axis 290. The object-side surface 211 and the image-side surface 212 are spherical.

The second lens 220 with negative refractive power is made of a plastic material and includes an object-side surface 221 and an image-side surface 222, wherein the object-side surface 221 of the second lens 220 is convex near the optical axis 290, and the image-side surface 222 of the second lens 220 is concave near the optical axis 290. The object-side surface 221 and the image-side surface 222 are aspheric.

The third lens 230 with positive refractive power is made of a glass material and includes an object-side surface 231 and an image-side surface 232, wherein the object-side surface 231 of the third lens 230 is convex near an optical axis 290, and the image-side surface 232 of the third lens 230 is convex near the optical axis 290. The object-side surface 231 and the image-side surface 232 are spheric.

The fourth lens 240 with positive refractive power is made of a plastic material and includes an object-side surface 241 and an image-side surface 242, wherein the object-side surface 241 of the fourth lens 240 is convex near an optical axis 290, and the image-side surface 242 of the fourth lens 240 is concave near the optical axis 290. The object-side surface 241 and the image-side surface 242 are aspheric.

The fifth lens 250 with positive refractive power is made of a plastic material and includes an object-side surface 251 and an image-side surface 252, wherein the object-side surface 251 of the fifth lens 250 is convex near the optical axis 290, and the image-side surface 252 of the fifth lens 250 is concave near the optical axis 290. The object-side surface 251 and the image-side surface 252 are aspheric.

The sixth lens 260 with positive refractive power is made of a plastic material and includes an object-side surface 261 and an image-side surface 262, wherein the object-side surface 261 of the sixth lens 260 is convex near the optical axis 290, and the image-side surface 262 of the sixth lens 260 is concave near the optical axis 290. The object-side surface 261 and the image-side surface 262 are aspheric.

The IR bandpass filter 270 is made of glass, and is disposed between the sixth lens 260 and the image plane 2000 without affecting a focal length of the optical lens assembly. It can be understood that, the IR bandpass filter 270 may also be formed on the surface of the above-mentioned lens. The IR bandpass filter 270 may also be made of other materials.

The cover glass 280 is made of glass and is disposed between the IR bandpass filter 270 and the image plane 2000 without affecting the focal length of the optical lens assembly. The cover glass 280 is used to protect the sensing element (not shown).

Refer to Table 3 and Table 4 below.

TABLE 3

Second embodiment
f (focal length) = 4.38 mm (millimeters), Fno (f-number) = 1.25,
FOV (field of view) = 97.23° (degrees)

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | Infinity | | | | |
| 1 | First lens | 6.694 | 0.600 | Glass | 1.52 | 64.20 | −9.35 |
| 2 | | 2.695 | 2.428 | | | | |
| 3 | Second lens | 18.995 (ASP) | 0.629 | Plastic | 1.66 | 20.37 | −31.40 |
| 4 | | 9.604 (ASP) | 0.178 | | | | |
| 5 | Stop | Infinity | 0.228 | | | | |
| 6 | Third lens | 38.372 | 1.628 | Glass | 2.00 | 28.32 | 5.44 |
| 7 | | −6.011 | 0.100 | | | | |
| 8 | Fourth lens | 22.636 (ASP) | 1.106 | Plastic | 1.64 | 23.97 | 140.45 |
| 9 | | 30.139 (ASP) | 1.498 | | | | |
| 10 | Fifth lens | 4.478 (ASP) | 1.167 | Plastic | 1.66 | 20.37 | 14.28 |
| 11 | | 7.948 (ASP) | 1.266 | | | | |
| 12 | Sixth lens | 3.307 (ASP) | 0.715 | Plastic | 1.66 | 20.37 | 2715.54 |
| 13 | | 3.035 (ASP) | 0.457 | | | | |

TABLE 3-continued

| Second embodiment<br>f (focal length) = 4.38 mm (millimeters), Fno (f-number) = 1.25,<br>FOV (field of view) = 97.23° (degrees) | | | | | | | |
|---|---|---|---|---|---|---|---|
| Surface | | Curvature radius (mm) | Central thickness/ gap (mm) | Material | Refractive index (nd) | Abbe number (vd) | Focal length (mm) |
| 14 | IR bandpass filter | Infinity | 0.300 | Glass | 1.52 | 64.17 | |
| 15 | | Infinity | 0.751 | | | | |
| 16 | Cover Glass | Infinity | 0.500 | Glass | 1.52 | 64.17 | |
| 17 | | Infinity | 0.450 | | | | |
| 18 | Image Plane | Infinity | | | | | |

Reference wavelength 940 nm

TABLE 4

| Aspheric coefficient | | | | |
|---|---|---|---|---|
| Surface | 3 | 4 | 8 | 9 |
| K: | 0.0000E+00 | 0.0000E+00 | 0.0000E+00 | 0.0000E+00 |
| A2: | 0.0000E+00 | 0.0000E+00 | 0.0000E+00 | 0.0000E+00 |
| A4: | −1.8592E−02 | −1.7914E−02 | −5.6205E−03 | −9.6288E−03 |
| A6: | −8.2911E−05 | 3.8238E−04 | −4.2161E−04 | −5.6224E−05 |
| A8: | −1.0172E−05 | 3.9066E−05 | −5.2693E−06 | 1.3011E−05 |
| A10: | −1.9946E−06 | −7.8905E−06 | 3.1785E−06 | 1.6284E−06 |
| A12: | 7.2176E−08 | 9.8054E−07 | 1.9827E−07 | −1.4086E−07 |
| A14: | −1.3051E−08 | −4.5692E−08 | −2.9928E−08 | −3.0405E−10 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| Surface | 10 | 11 | 12 | 13 |
| K: | 0.0000E+00 | 0.0000E+00 | −5.8387E+00 | −8.7037E−01 |
| A2: | 0.0000E+00 | 0.0000E+00 | 0.0000E+00 | 0.0000E+00 |
| A4: | −4.9240E−03 | −6.8561E−03 | −1.0020E−02 | −2.2346E−02 |
| A6: | 8.5757E−04 | 2.3825E−03 | −2.4680E−03 | 3.1088E−05 |
| A8: | −2.2906E−04 | −4.9084E−04 | 3.7262E−04 | 1.9748E−04 |
| A10: | 2.6883E−05 | 5.1530E−05 | −2.2448E−05 | −2.0263E−05 |
| A12: | −1.1144E−06 | −1.8925E−06 | 9.9557E−07 | 9.2355E−07 |
| A14: | 4.2548E−09 | 2.8138E−09 | −3.8286E−08 | −1.8451E−08 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |

In the second embodiment, an aspheric curve equation is expressed as that in the first embodiment. In addition, definitions of parameters in the following tables are the same as those in the first embodiment, and are not repeated herein.

Referring to Table 3 and Table 4, the following data may be calculated:

| Second embodiment | | | |
|---|---|---|---|
| FOV*EPD | 340.75°*mm | TL*(CT1/T12) | 3.46 mm |
| TL/IMH | 3.41 | TL/BFL | 5.70 |
| (CT3 + CT6)/T34 | 23.43 | CRA/(BFL*f) | 2.79°/mm$^2$ |
| (R5*R6)/(f3*CT3) | −26.02 | ΣAT*CRA/BFL | 69.57° |
| T45/(R8/R9) | 0.22 mm | f2/f1 | 3.36 |
| (CRA*EPD)/TL | 7.51° | R1/R2 | 2.48 |
| (CT6*f6)/f | 443.42 mm | (f3*CT3)/f | 2.02 mm |
| IMH*R2/EPD | 3.15 mm | f/R11 | 1.32 |
| R1/R2*EPD | 8.7 mm | (CT1 + T12 + CT2 + T2S)/EPD | 1.09 |

-continued

| Second embodiment | | | |
|---|---|---|---|
| FOV/TL | 6.94°/mm | (CT3 + CT4 + CT5)/ (CT1 + CT2) | 3.17 |

Third Embodiment

Figure 3A:
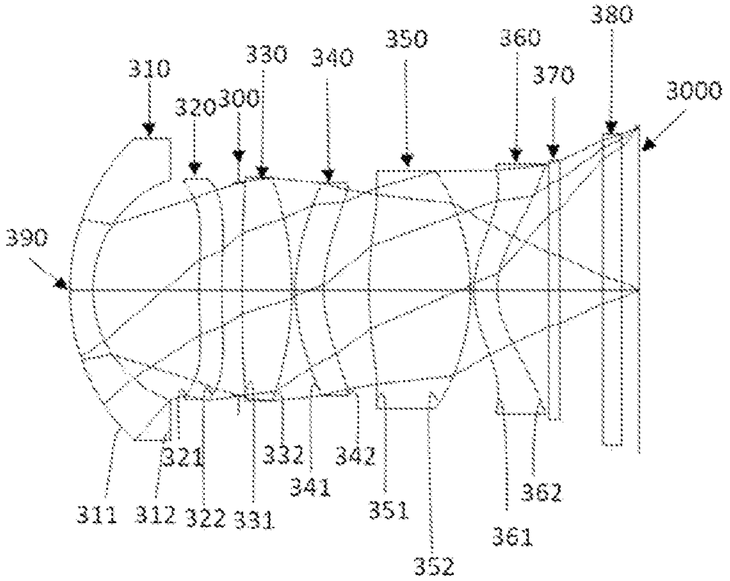
FIG. 3A is a schematic view of an optical lens assembly according to a third embodiment of the present disclosure of the present disclosure.
Figure 3B:
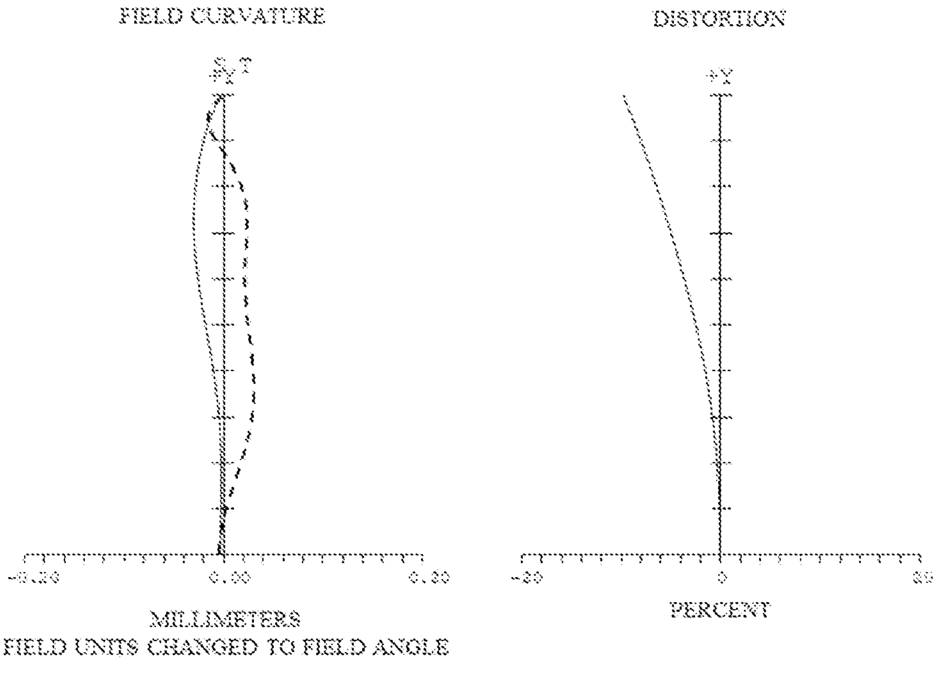
FIG. 3B shows a field curvature curves and a distortion curve of the optical lens assembly according to the third embodiment.

Refer to FIG. 3A and FIG. 3B. FIG. 3A is a schematic view of an optical lens assembly according to a third embodiment of the present disclosure, and FIG. 3B shows a field curvature curve and a distortion curve of an optical lens assembly according to a second embodiment. As can be seen from FIG. 3A, the optical lens assembly includes, in order from an object side to an image side: a first lens 310, a second lens 320, a stop 300, a third lens 330, a fourth lens 340, a fifth lens 350, a sixth lens 360, an IR bandpass filter 370, a cover glass 380 and an image plane 3000. A total quantity of lenses with refractive power in the optical lens assembly is six, but not limited thereto.

The first lens 310 with negative refractive power is made of a glass material and includes an object-side surface 311 and an image-side surface 312, wherein the object-side surface 311 of the first lens 310 is convex near an optical axis 390, and the image-side surface 312 of the first lens 310 is concave near the optical axis 390. The object-side surface 311 and the image-side surface 312 are spheric.

The second lens 320 with negative refractive power is made of a plastic material and includes an object-side surface 321 and an image-side surface 322, wherein the object-side surface 321 of the second lens 320 is convex near the optical axis 390, and the image-side surface 322 of the second lens 320 is concave near the optical axis 390. The object-side surface 321 and the image-side surface 322 are aspheric.

The third lens 330 with positive refractive power is made of a glass material and includes an object-side surface 331 and an image-side surface 332, wherein the object-side surface 331 of the third lens 330 is convex near an optical axis 390, and the image-side surface 332 of the third lens 330 is convex near the optical axis 390. The object-side surface 331 and the image-side surface 332 are spheric.

The fourth lens 340 with negative refractive power is made of a plastic material and includes an object-side surface 341 and an image-side surface 342, wherein the object-side surface 341 of the fourth lens 340 is convex near an optical axis 390, and the image-side surface 342 of the fourth lens 340 is concave near the optical axis 390. The object-side surface 341 and the image-side surface 342 are aspheric.

The fifth lens 350 with positive refractive power is made of a plastic material and includes an object-side surface 351 and an image-side surface 352, wherein the object-side surface 351 of the fifth lens 350 is convex near the optical axis 390, and the image-side surface 352 of the fifth lens 350 is convex near the optical axis 390. The object-side surface 351 and the image-side surface 352 are aspheric.

The sixth lens 360 with negative refractive power is made of a plastic material and includes an object-side surface 361 and an image-side surface 362, wherein the object-side surface 361 of the sixth lens 360 is convex near the optical axis 390, and the image-side surface 362 of the sixth lens 360 is concave near the optical axis 390. The object-side surface 361 and the image-side surface 362 are aspheric.

The IR bandpass filter 370 is made of glass, and is disposed between the sixth lens 360 and the image plane 3000 without affecting a focal length of the optical lens assembly. It can be understood that, the IR bandpass filter 370 may also be formed on the surface of the above-mentioned lens. The IR bandpass filter 370 may also be made of other materials.

The cover glass 380 is made of glass and is disposed between the IR bandpass filter 370 and the image plane 3000 without affecting the focal length of the optical lens assembly. The cover glass 380 is used to protect the sensing element (not shown).

Refer to Table 5 and Table 6 below.

TABLE 5

Third embodiment
f (focal length) = 4.34 mm (millimeters), Fno (f-number) = 1.20,
FOV (field of view) = 90.96° (degrees)

| Surface | | Curvature radius (mm) | Central thickness/ gap (mm) | Material | Refractive index (nd) | Abbe number (vd) | Focal length (mm) |
|---|---|---|---|---|---|---|---|
| 0 | Object | Infinity | Infinity | | | | |
| 1 | First lens | 5.240 | 0.600 | Glass | 1.90 | 31.32 | −8.88 |
| 2 | | 2.966 | 2.788 | | | | |
| 3 | Second lens | 13.273 (ASP) | 0.600 | Plastic | 1.66 | 20.37 | −198.10 |
| 4 | | 11.793 (ASP) | 0.462 | | | | |
| 5 | Stop | Infinity | 0.090 | | | | |
| 6 | Third lens | 42.745 | 1.305 | Glass | 1.90 | 31.32 | 7.79 |
| 7 | | −8.028 | 0.091 | | | | |
| 8 | Fourth lens | 4.038 (ASP) | 0.756 | Plastic | 1.64 | 23.97 | −81.28 |
| 9 | | 3.469 (ASP) | 1.187 | | | | |
| 10 | Fifth lens | 9.541 (ASP) | 2.672 | Plastic | 1.64 | 23.53 | 5.69 |
| 11 | | −4.953 (ASP) | 0.091 | | | | |
| 12 | Sixth lens | 2.568 (ASP) | 0.600 | Plastic | 1.66 | 20.37 | −18.65 |
| 13 | | 1.918 (ASP) | 1.378 | | | | |
| 14 | IR bandpass filter | Infinity | 0.300 | Glass | 1.52 | 64.17 | |
| 15 | | Infinity | 1.130 | | | | |
| 16 | Cover Glass | Infinity | 0.500 | Glass | 1.52 | 64.17 | |
| 17 | | Infinity | 0.450 | | | | |
| 18 | Image Plane | Infinity | | | | | |

Reference wavelength 940 nm

TABLE 6

| Aspheric coefficient | | | | |
|---|---|---|---|---|
| Surface | 3 | 4 | 8 | 9 |
| K: | −1.5032E+01 | 1.2598E+01 | −2.1312E+00 | −6.6186E−01 |
| A2: | 0.0000E+00 | 0.0000E+00 | 0.0000E+00 | 0.0000E+00 |
| A4: | −9.9498E−03 | −1.3121E−02 | −5.2241E−03 | −1.1403E−02 |
| A6: | 3.5028E−04 | 7.9465E−04 | 3.7056E−04 | 4.9236E−04 |
| A8: | −1.4972E−04 | −1.5007E−04 | 2.5110E−05 | 1.0956E−05 |
| A10: | 2.1545E−05 | 1.3838E−05 | −3.5060E−06 | −2.1190E−08 |
| A12: | −1.6835E−06 | −7.6440E−07 | 1.3096E−07 | −2.2967E−07 |
| A14: | 4.5980E−13 | 4.5982E−13 | −3.0847E−13 | 1.3352E−08 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| Surface | 10 | 11 | 12 | 13 |
| K: | 0.0000E+00 | 0.0000E+00 | −2.7440E+00 | −7.9126E−01 |
| A2: | 0.0000E+00 | 0.0000E+00 | 0.0000E+00 | 0.0000E+00 |
| A4: | −2.6513E−04 | 3.8187E−03 | −3.3365E−03 | −2.4896E−02 |
| A6: | −5.9180E−04 | −3.8329E−04 | −1.4104E−03 | 7.2577E−04 |
| A8: | 2.9215E−05 | 9.9493E−06 | 1.4807E−04 | 7.9662E−06 |
| A10: | −1.5965E−06 | 2.7163E−07 | −5.1168E−06 | −1.8566E−06 |
| A12: | −4.2613E−09 | −2.4502E−08 | 2.2952E−10 | 4.3663E−10 |
| A14: | 1.2179E−12 | 2.4965E−12 | 2.5510E−12 | 2.5804E−12 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |

In the third embodiment, an aspheric curve equation is expressed as that in the first embodiment. In addition, definitions of parameters in the following tables are the same as those in the first embodiment, and are not repeated herein.

Referring to Table 5 and Table 6, the following data may be calculated:

| Third embodiment | | | |
|---|---|---|---|
| FOV*EPD | 328.6°*mm | TL*(CT1/T12) | 3.23 mm |
| TL/IMH | 3.66 | TL/BFL | 6.05 |
| (CT3 + CT6)/T34 | 20.94 | CRA/(BFL*f) | 3.07°/mm$^2$ |
| (R5*R6)/(f3*CT3) | −33.75 | ΣAT*CRA/BFL | 62.58° |
| T45/(R8/R9) | 3.26 mm | f2/f1 | 22.30 |
| (CRA*EPD)/TL | 7.94° | R1/R2 | 1.77 |
| (CT6*f6)/f | −2.58 mm | (f3*CT3)/f | 2.35 mm |
| IMH*R2/EPD | 3.37 mm | f/R11 | 1.69 |
| R1/R2*EPD | 6.38 mm | (CT1 + T12 + CT2 + T2S)/EPD | 1.23 |
| FOV/TL | 6.06°/mm | (CT3 + CT4 + CT5)/(CT1 + CT2) | 3.95 |

Fourth Embodiment

Figure 4A:
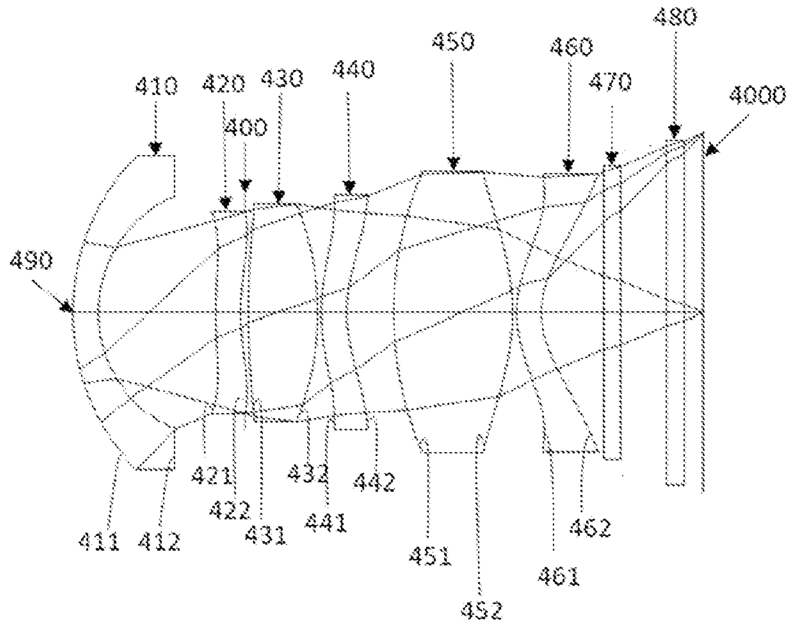
FIG. 4A is a schematic view of an optical lens assembly according to a fourth embodiment of the present disclosure of the present disclosure.
Figure 4B:
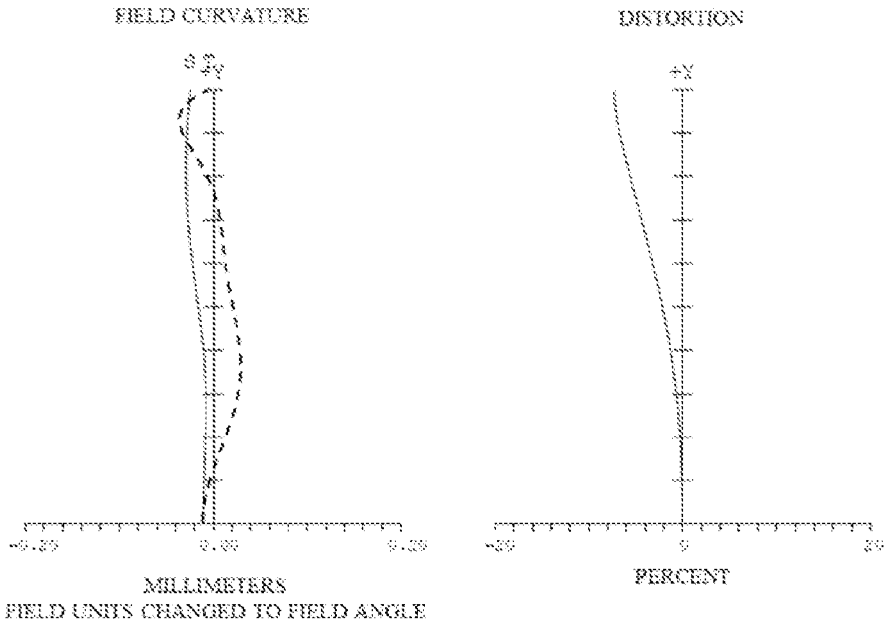
FIG. 4B shows a field curvature curves and a distortion curve of the optical lens assembly according to the fourth embodiment.

Refer to FIG. 4A and FIG. 4B. FIG. 4A is a schematic view of an optical lens assembly according to a fourth embodiment of the present disclosure, and FIG. 4B shows a field curvature curve and a distortion curve of an optical lens assembly according to a second embodiment. As can be seen from FIG. 4A, the optical lens assembly includes, in order from an object side to an image side: a first lens 410, a second lens 420, a stop 400, a third lens 430, a fourth lens 440, a fifth lens 450, a sixth lens 460, an IR bandpass filter 470, a cover glass 480 and an image plane 4000. A total quantity of lenses with refractive power in the optical lens assembly is six, but not limited thereto.

The first lens 410 with negative refractive power is made of a glass material and includes an object-side surface 411 and an image-side surface 412, wherein the object-side surface 411 of the first lens 410 is convex near an optical axis 490, and the image-side surface 412 of the first lens 410 is concave near the optical axis 490. The object-side surface 411 and the image-side surface 412 are spheric.

The second lens 420 with negative refractive power is made of a plastic material and includes an object-side surface 421 and an image-side surface 422, wherein the object-side surface 421 of the second lens 420 is convex near the optical axis 490, and the image-side surface 422 of the second lens 420 is concave near the optical axis 490. The object-side surface 421 and the image-side surface 422 are aspheric.

The third lens 430 with positive refractive power is made of a glass material and includes an object-side surface 431 and an image-side surface 432, wherein the object-side surface 431 of the third lens 430 is convex near an optical axis 490, and the image-side surface 432 of the third lens 430 is convex near the optical axis 490. The object-side surface 431 and the image-side surface 432 are spheric.

The fourth lens 440 with negative refractive power is made of a plastic material and includes an object-side surface 441 and an image-side surface 442, wherein the object-side surface 441 of the fourth lens 440 is convex near an optical axis 490, and the image-side surface 442 of the fourth lens 440 is concave near the optical axis 490. The object-side surface 441 and the image-side surface 442 are aspheric.

The fifth lens 450 with positive refractive power is made of a plastic material and includes an object-side surface 451 and an image-side surface 452, wherein the object-side surface 451 of the fifth lens 450 is convex near the optical axis 490, and the image-side surface 452 of the fifth lens 450 is convex near the optical axis 490. The object-side surface 451 and the image-side surface 452 are aspheric.

The sixth lens 460 with negative refractive power is made of a plastic material and includes an object-side surface 461 and an image-side surface 462, wherein the object-side surface 461 of the sixth lens 460 is convex near the optical axis 490, and the image-side surface 462 of the sixth lens 460 is concave near the optical axis 490. The object-side surface 461 and the image-side surface 462 are aspheric.

The IR bandpass filter 470 is made of glass, and is disposed between the sixth lens 460 and the image plane 4000 without affecting a focal length of the optical lens assembly. It can be understood that, the IR bandpass filter 470 may also be formed on the surface of the above-mentioned lens. The IR bandpass filter 470 may also be made of other materials.

The cover glass 480 is made of glass and is disposed between the IR bandpass filter 470 and the image plane 4000 without affecting the focal length of the optical lens assembly. The cover glass 480 is used to protect the sensing element (not shown).

Refer to Table 7 and Table 8 below.

TABLE 7

Fourth embodiment
f (focal length) = 4.32 mm (millimeters), Fno (f-number) = 1.20,
FOV (field of view) = 92.04° (degrees)

| Surface | | Curvature radius (mm) | Central thickness/ gap (mm) | Material | Refractive index (nd) | Abbe number (vd) | Focal length (mm) |
|---|---|---|---|---|---|---|---|
| 0 | Object | Infinity | Infinity | | | | |
| 1 | First lens | 5.046 | 0.600 | Glass | 1.90 | 31.32 | −8.72 |
| 2 | | 2.872 | 2.788 | | | | |
| 3 | Second lens | 8.891 (ASP) | 0.600 | Plastic | 1.66 | 20.37 | −24.35 |
| 4 | | 5.492 (ASP) | 0.091 | | | | |
| 5 | Stop | Infinity | 0.090 | | | | |
| 6 | Third lens | 20.586 | 1.644 | Glass | 1.90 | 31.32 | 5.82 |
| 7 | | −6.548 | 0.091 | | | | |
| 8 | Fourth lens | 4.013 (ASP) | 0.600 | Plastic | 1.66 | 20.37 | −30.46 |
| 9 | | 3.129 (ASP) | 1.121 | | | | |
| 10 | Fifth lens | 8.231 (ASP) | 2.837 | Plastic | 1.64 | 23.53 | 5.48 |
| 11 | | −4.922 (ASP) | 0.091 | | | | |
| 12 | Sixth lens | 2.563 (ASP) | 0.600 | Plastic | 1.66 | 20.37 | −18.98 |
| 13 | | 1.921 (ASP) | 1.499 | | | | |
| 14 | IR bandpass filter | Infinity | 0.300 | Glass | 1.52 | 64.17 | |
| 15 | | Infinity | 1.098 | | | | |
| 16 | Cover Glass | Infinity | 0.500 | Glass | 1.52 | 64.17 | |
| 17 | | Infinity | 0.450 | | | | |
| 18 | Image Plane | Infinity | | | | | |

Reference wavelength 940 nm

TABLE 8

Aspheric coefficient

| Surface | 3 | 4 | 8 | 9 |
|---|---|---|---|---|
| K: | −3.3790E+01 | 1.2598E+01 | −3.8511E+00 | −2.0390E+00 |
| A2: | 0.0000E+00 | 0.0000E+00 | 0.0000E+00 | 0.0000E+00 |
| A4: | −9.5015E−03 | −1.3121E−02 | −9.6523E−03 | −1.3904E−02 |
| A6: | −2.3157E−04 | 7.9465E−04 | 2.2757E−04 | 7.5479E−04 |
| A8: | −2.0512E−05 | −1.5007E−04 | 2.2022E−05 | −1.7160E−06 |
| A10: | 5.8393E−06 | 1.3838E−05 | −2.8341E−06 | −5.4477E−07 |
| A12: | −9.0507E−07 | −7.6440E−07 | 7.3629E−08 | −1.7269E−07 |
| A14: | 4.5980E−13 | 4.5982E−13 | −3.0847E−13 | 8.8196E−09 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |

| Surface | 10 | 11 | 12 | 13 |
|---|---|---|---|---|
| K: | 0.0000E+00 | 0.0000E+00 | −2.4676E+00 | −9.2258E−01 |
| A2: | 0.0000E+00 | 0.0000E+00 | 0.0000E+00 | 0.0000E+00 |
| A4: | 2.0842E−03 | 5.7632E−03 | −4.3088E−03 | −2.2294E−02 |
| A6: | −6.0615E−04 | −3.2722E−04 | −1.0240E−03 | 9.6485E−04 |
| A8: | 6.8591E−05 | 1.6228E−05 | 1.0452E−04 | −1.2808E−05 |
| A10: | −2.9814E−06 | 1.2953E−06 | −3.6070E−06 | −3.2919E−07 |
| A12: | 3.6594E−08 | −8.1943E−08 | 2.2952E−10 | 4.3663E−10 |
| A14: | 1.2179E−12 | 2.4965E−12 | 2.5510E−12 | 2.5804E−12 |
| A16: | 0.0000E+00 | 0.0000E+00 | 0.0000E+00 | 0.0000E+00 |

TABLE 8-continued

| Aspheric coefficient | | | | |
|---|---|---|---|---|
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |

In the fourth embodiment, an aspheric curve equation is expressed as that in the first embodiment. In addition, definitions of parameters in the following tables are the same as those in the first embodiment, and are not repeated herein.

Referring to Table 7 and Table 8, the following data may be calculated:

| Fourth embodiment | | | |
|---|---|---|---|
| FOV*EPD | 331.07°*mm | TL*(CT1/T12) | 3.23 mm |
| TL/IMH | 3.66 | TL/BFL | 6.00 |
| (CT3 + CT6)/T34 | 24.66 | CRA/(BFL*f) | 3.02°/mm$^2$ |
| (R5*R6)/(f3*CT3) | −14.07 | ΣAT*CRA/BFL | 55.76° |
| T45/(R8/R9) | 2.95 mm | f2/f1 | 2.79 |
| (CRA*EPD)/TL | 7.83° | R1/R2 | 1.76 |
| (CT6*f6)/f | −2.64 mm | (f3*CT3)/f | 2.22 mm |
| IMH*R2/EPD | 3.27 mm | f/R11 | 1.68 |
| R1/R2*EPD | 6.32 mm | (CT1 + T12 + CT2 + T2S)/EPD | 1.13 |
| FOV/TL | 6.14°/mm | (CT3 + CT4 + CT5)/(CT1 + CT2) | 4.23 |

Fifth Embodiment

Figure 5A:
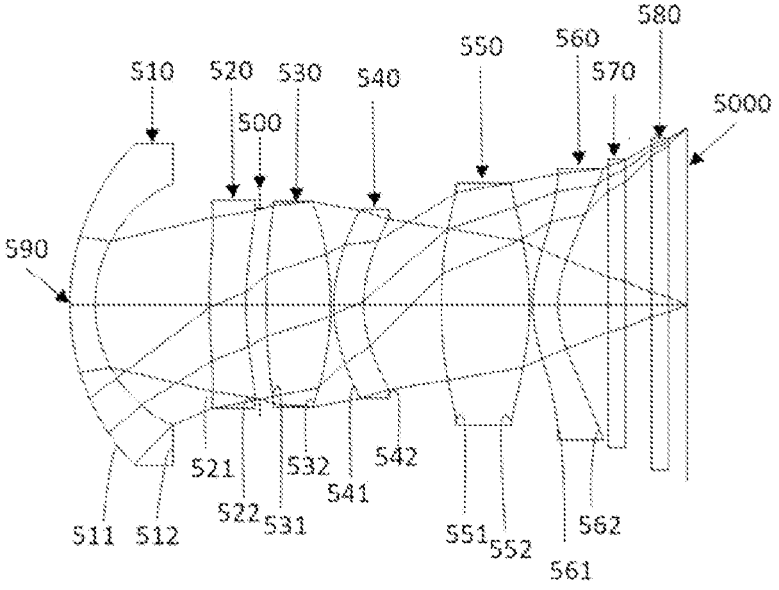
FIG. 5A is a schematic view of an optical lens assembly according to a fifth embodiment of the present disclosure of the present disclosure.
Figure 5B:
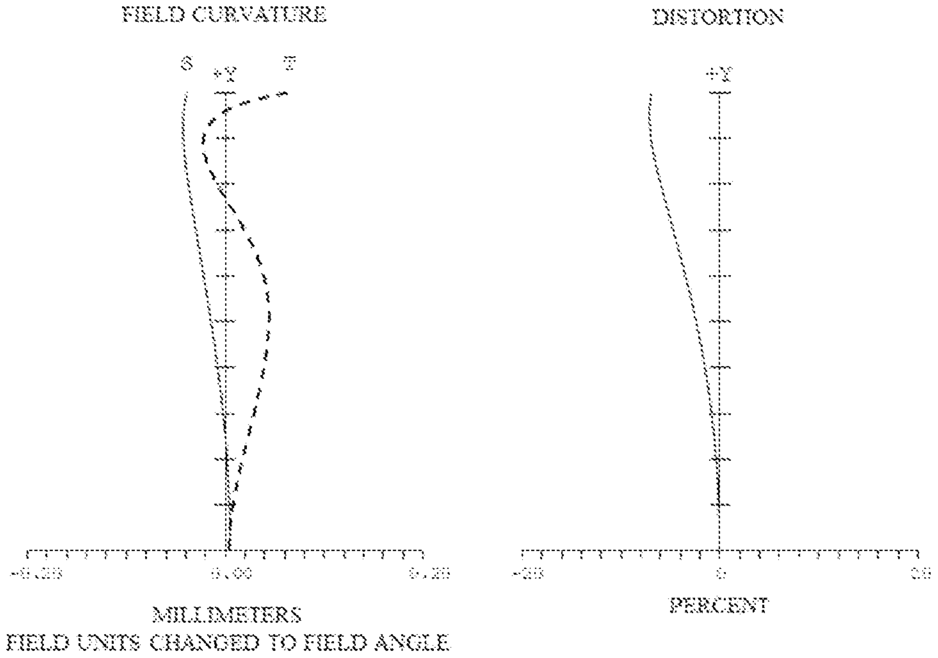
FIG. 5B shows a field curvature curves and a distortion curve of the optical lens assembly according to the fifth embodiment.

Refer to FIG. 5A and FIG. 5B. FIG. 5A is a schematic view of an optical lens assembly according to a fifth embodiment of the present disclosure, and FIG. 5B shows a field curvature curve and a distortion curve of an optical lens assembly according to a second embodiment. As can be seen from FIG. 5A, the optical lens assembly includes, in order from an object side to an image side: a first lens 510, a second lens 520, a stop 500, a third lens 530, a fourth lens 540, a fifth lens 550, a sixth lens 560, an IR bandpass filter 570, a cover glass 580 and an image plane 5000. A total quantity of lenses with refractive power in the optical lens assembly is six, but not limited thereto.

The first lens 510 with negative refractive power is made of a glass material and includes an object-side surface 511 and an image-side surface 512, wherein the object-side surface 511 of the first lens 510 is convex near an optical axis 590, and the image-side surface 512 of the first lens 510 is concave near the optical axis 590. The object-side surface 511 and the image-side surface 512 are spheric.

The second lens 520 with negative refractive power is made of a plastic material and includes an object-side surface 521 and an image-side surface 522, wherein the object-side surface 521 of the second lens 520 is convex near the optical axis 590, and the image-side surface 522 of the second lens 520 is concave near the optical axis 590. The object-side surface 521 and the image-side surface 522 are aspheric.

The third lens 530 with positive refractive power is made of a glass material and includes an object-side surface 531 and an image-side surface 532, wherein the object-side surface 531 of the third lens 530 is convex near an optical axis 590, and the image-side surface 532 of the third lens 530 is convex near the optical axis 590. The object-side surface 531 and the image-side surface 532 are spheric.

The fourth lens 540 with negative refractive power is made of a plastic material and includes an object-side surface 541 and an image-side surface 542, wherein the object-side surface 541 of the fourth lens 540 is convex near an optical axis 590, and the image-side surface 542 of the fourth lens 540 is concave near the optical axis 590. The object-side surface 541 and the image-side surface 542 are aspheric.

The fifth lens 550 with positive refractive power is made of a plastic material and includes an object-side surface 551 and an image-side surface 552, wherein the object-side surface 551 of the fifth lens 550 is convex near the optical axis 590, and the image-side surface 552 of the fifth lens 550 is convex near the optical axis 590. The object-side surface 551 and the image-side surface 552 are aspheric.

The sixth lens 560 with negative refractive power is made of a plastic material and includes an object-side surface 561 and an image-side surface 562, wherein the object-side surface 561 of the sixth lens 560 is convex near the optical axis 590, and the image-side surface 562 of the sixth lens 560 is concave near the optical axis 590. The object-side surface 561 and the image-side surface 562 are aspheric.

The IR bandpass filter 570 is made of glass, and is disposed between the sixth lens 560 and the image plane 5000 without affecting a focal length of the optical lens assembly. It can be understood that, the IR bandpass filter 570 may also be formed on the surface of the above-mentioned lens. The IR bandpass filter 570 may also be made of other materials.

The cover glass 580 is made of glass and is disposed between the IR bandpass filter 570 and the image plane 5000 without affecting the focal length of the optical lens assembly. The cover glass 580 is used to protect the sensing element (not shown).

Refer to Table 9 and Table 10 below.

TABLE 9

| Fifth embodiment<br>f (focal length) = 4.34 mm (millimeters), Fno (f-number) = 1.25,<br>FOV (field of view) = 91.61° (degrees) | | | | | | | |
|---|---|---|---|---|---|---|---|
| Surface | | Curvature radius (mm) | Central thickness/ gap (mm) | Material | Refractive index (nd) | Abbe number (vd) | Focal length (mm) |
| 0 | Object | Infinity | Infinity | | | | |
| 1 | First lens | 5.413 | 0.600 | Glass | 1.90 | 31.32 | −9.24 |

TABLE 9-continued

| Fifth embodiment f (focal length) = 4.34 mm (millimeters), Fno (f-number) = 1.25, FOV (field of view) = 91.61° (degrees) | | | | | | | |
|---|---|---|---|---|---|---|---|
| Surface | | Curvature radius (mm) | Central thickness/ gap (mm) | Material | Refractive index (nd) | Abbe number (vd) | Focal length (mm) |
| 2 | | 3.079 | 2.788 | | | | |
| 3 | Second lens | 9.368 (ASP) | 0.893 | Plastic | 1.64 | 23.97 | −40.50 |
| 4 | | 6.553 (ASP) | 0.326 | | | | |
| 5 | Stop | Infinity | 0.156 | | | | |
| 6 | Third lens | 15.977 | 1.560 | Glass | 1.90 | 31.32 | 5.71 |
| 7 | | −6.970 | 0.091 | | | | |
| 8 | Fourth lens | 3.428 (ASP) | 0.724 | Plastic | 1.66 | 20.37 | −66.86 |
| 9 | | 2.912 (ASP) | 1.880 | | | | |
| 10 | Fifth lens | 10.146 (ASP) | 2.135 | Plastic | 1.66 | 20.37 | 6.59 |
| 11 | | −6.508 (ASP) | 0.091 | | | | |
| 12 | Sixth lens | 2.958 (ASP) | 0.600 | Plastic | 1.66 | 20.37 | −23.47 |
| 13 | | 2.273 (ASP) | 1.241 | | | | |
| 14 | IR bandpass filter | Infinity | 0.300 | Glass | 1.52 | 64.17 | |
| 15 | | Infinity | 0.663 | | | | |
| 16 | Cover Glass | Infinity | 0.500 | Glass | 1.52 | 64.17 | |
| 17 | | Infinity | 0.450 | | | | |
| 18 | Image Plane | Infinity | | | | | |

Reference wavelength 940 nm

TABLE 10

| Aspheric coefficient | | | | |
|---|---|---|---|---|
| Surface | 3 | 4 | 8 | 9 |
| K: | −2.2506E+01 | 3.5785E+00 | −1.2303E+00 | −4.6226E−01 |
| A2: | 0.0000E+00 | 0.0000E+00 | 0.0000E+00 | 0.0000E+00 |
| A4: | −5.2015E−03 | −9.2519E−03 | −4.4910E−03 | −9.2519E−03 |
| A6: | 3.6531E−04 | 3.5905E−04 | 3.6851E−04 | 3.5905E−04 |
| A8: | −1.1792E−04 | 3.1328E−05 | 1.5213E−05 | 3.1328E−05 |
| A10: | 1.3623E−05 | −5.5994E−07 | −1.7750E−06 | −5.5994E−07 |
| A12: | −6.0914E−07 | −2.6406E−07 | −6.9763E−09 | −2.6406E−07 |
| A14: | 4.5980E−13 | 3.8676E−09 | −3.0847E−13 | 3.8676E−09 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |
| Surface | 10 | 11 | 12 | 13 |
| K: | 0.0000E+00 | 0.0000E+00 | −2.6830E+00 | −6.8706E−01 |
| A2: | 0.0000E+00 | 0.0000E+00 | 0.0000E+00 | 0.0000E+00 |
| A4: | 2.2995E−03 | 3.7982E−03 | −8.4377E−03 | −2.4170E−02 |
| A6: | −5.5606E−04 | −2.1251E−04 | −4.0168E−04 | 1.1537E−03 |
| A8: | 5.6772E−05 | 4.8866E−06 | 1.1914E−04 | −1.5295E−05 |
| A10: | −1.4361E−06 | 2.6611E−06 | −5.8046E−06 | −1.7017E−06 |
| A12: | 7.6788E−09 | −1.1517E−07 | 2.2952E−10 | 4.3663E−10 |
| A14: | 1.2179E−12 | 2.4965E−12 | 2.5510E−12 | 2.5804E−12 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |
| A22: | 0.0000E+00 | 0.0000E+00 | 0.0000E+00 | 0.0000E+00 |
| A24: | 0.0000E+00 | 0.0000E+00 | 0.0000E+00 | 0.0000E+00 |

In the fifth embodiment, an aspheric curve equation is expressed as that in the first embodiment. In addition, definitions of parameters in the following tables are the same as those in the first embodiment, and are not repeated herein.

Referring to Table 9 and Table 10, the following data may be calculated:

| Fifth embodiment | | | |
|---|---|---|---|
| FOV*EPD | 317.87°*mm | TL*(CT1/T12) | 3.23 mm |
| TL/IMH | 3.66 | TL/BFL | 7.50 |
| (CT3 + CT6)/T34 | 23.74 | CRA/(BFL*f) | 3.8°/mm$^2$ |
| (R5*R6)/(f3*CT3) | −12.50 | ΣAT*CRA/BFL | 87.87° |
| T45/(R8/R9) | 6.55 mm | f2/f1 | 4.38 |
| (CRA*EPD)/TL | 7.62° | R1/R2 | 1.76 |
| (CT6*f6)/f | −3.25 mm | (f3*CT3)/f | 2.05 mm |
| IMH*R2/EPD | 3.64 mm | f/R11 | 1.47 |
| R1/R2*EPD | 6.1 mm | (CT1 + T12 + CT2 + T2S)/EPD | 1.33 |
| FOV/TL | 6.11°/mm | (CT3 + CT4 + CT5)/(CT1 + CT2) | 2.96 |

In the optical lens assembly provided in the present disclosure, for the lens with refractive power, if the surface of the lens is convex and a position of the convex surface is not defined, it indicates that the surface of the lens is convex near the optical axis. If the surface of the lens is concave and a position of the concave surface is not defined, it indicates that the surface of the lens is concave near the optical axis.

The optical lens assembly provided in the present disclosure can be applicable to an optical system having an ultra-wide-angle, high image quality and miniaturization according to the requirements, and can be used in many technical applications such as photography, monitoring equipment, automation equipment, vehicle surround systems, and electronic imaging systems of the Internet of Things (IOT) devices, but not limited thereto.

What is claimed is:

1. An optical lens assembly comprising a stop, and in order from an object side to an image side, comprising:

a first lens with refractive power;

a second lens with negative refractive power, comprising an object-side surface and an image-side surface, wherein at least one of the object-side surface and the image-side surface of the second lens is aspheric;

a third lens with refractive power, comprising an object-side surface and an image-side surface, wherein the object-side surface of the third lens is convex near the optical axis;

a fourth lens with refractive power, comprising an object-side surface and an image-side surface, wherein the object-side surface of the fourth lens is convex near the optical axis;

a fifth lens with refractive power, comprising an object-side surface and an image-side surface, wherein at least one of the object-side surface and the image-side surface of the fifth lens is aspheric; and a sixth lens with refractive power, comprising an object-side surface and an image-side surface, wherein the object-side surface of the sixth lens is convex near the optical axis, the image-side surface of the sixth lens is concave near the optical axis, and at least one of the object-side surface and the image-side surface of the sixth lens is aspheric;

wherein a maximum field of view of the optical lens assembly is FOV, an entrance pupil diameter of the optical lens assembly is EPD, a curvature radius of the object-side surface of the third lens is R5, a curvature radius of the image-side surface of the third lens is R6, a focal length of the third lens is f3, a central thickness of the third lens along the optical axis is CT3, and the following condition is satisfied: 254.30°*mm<FOV*EPD<418.64°*mm;

and −40.49< (R5*R6)/(f3*CT3)<−10.00.

2. The optical lens assembly according to claim 1, wherein a distance from an object-side surface of the first lens to an image plane along the optical axis is TL, a maximum image height of the optical lens assembly is IMH, and the following condition is satisfied: 2.73<TL/IMH<4.39.

3. The optical lens assembly according to claim 1, wherein a central thickness of the third lens along the optical axis is CT3, a central thickness of the sixth lens along the optical axis is CT6, a distance from the image-side surface of the third lens to the object-side surface of the fourth lens along the optical axis is T34, and the following condition is satisfied: 1.52<(CT3+CT6)/T34<29.60.

4. The optical lens assembly according to claim 1, wherein a distance from the image-side surface of the fourth lens to the object-side surface of the fifth lens along the optical axis is T45, a curvature radius of the image-side surface of the fourth lens is R8, a curvature radius of the object-side surface of the fifth lens is R9, and the following condition is satisfied: 0.18 mm<T45/(R8/R9)<7.86 mm.

5. The optical lens assembly according to claim 1, wherein an incident angle where a chief ray is incident on an image plane at a maximum view angle of the optical lens assembly is CRA, a distance from the object-side surface of the first lens to the image plane along the optical axis is TL, and the following condition is satisfied: 4.79°<(CRA*EPD)/TL<9.53°.

6. The optical lens assembly according to claim 1, wherein a central thickness of the sixth lens along the optical axis is CT6, a focal length of the sixth lens is f6, a focal length of the optical lens assembly is f, and the following condition is satisfied: −3.90 mm<(CT6*f6)/f<532.11 mm.

7. The optical lens assembly according to claim 6, wherein a maximum image height of the optical lens assembly is IMH, a curvature radius of the image-side surface of the first lens is R2, the following condition is satisfied: 2.52 mm<(IMH*R2)/EPD<4.43 mm.

8. The optical lens assembly according to claim 1, wherein a curvature radius of the object-side surface of the first lens is R1, a curvature radius of the image-side surface of the first lens is R2, and the following condition is satisfied: 4.88 mm<(R1/R2)*EPD<10.44 mm.

9. The optical lens assembly according to claim 8, wherein a distance from the object-side surface of the first lens to the image plane along the optical axis is TL, and the following condition is satisfied: 4.85°/mm<FOV/TL<8.33°/mm.

10. The optical lens assembly according to claim 1, wherein a distance from the object-side surface of the first lens to the image plane along the optical axis is TL, a central thickness of the first lens along the optical axis is CT1, a distance from the image-side surface of the first lens to the object-side surface of the second lens along the optical axis is T12, and the following condition is satisfied: 2.58 mm<TL*(CT1/T12)<4.26 mm.

11. The optical lens assembly according to claim 1, wherein a distance from the object-side surface of the first lens to the image plane along the optical axis is TL, a distance from the image-side surface of the fifth lens to the image plane along the optical axis is BFL, and the following condition is satisfied: 4.56<TL/BFL<9.00.

12. The optical lens assembly according to claim 1, wherein an incident angle where a chief ray is incident on an image plane at a maximum view angle of the optical lens assembly is CRA, a distance from the image-side surface of the fifth lens to the image plane along the optical axis is BFL, a focal length of the optical lens assembly is f, and the following condition is satisfied: $1.71°/mm^2<CRA/(BFL*f)<4.56\ m°/mm^2$.

13. The optical lens assembly according to claim 1, wherein a sum of the distances between any two adjacent lenses along the optical axis is ΣAT, an incident angle where a chief ray is incident on an image plane at a maximum view angle of the optical lens assembly is CRA, a distance from the image-side surface of the fifth lens to the image plane along the optical axis is BFL, and the following condition is satisfied: $44.61°<\Sigma*CRA/BFL<105.44°$.

14. The optical lens assembly according to claim 1, wherein a focal length of the first lens is f1, a focal length of the second lens is f2, and the following condition is satisfied: $0.60<f2/f1<26.76$.

15. The optical lens assembly according to claim 1, wherein a curvature radius of the object-side surface of the first lens is R1, a curvature radius of the image-side surface of the first lens is R2, and the following condition is satisfied: $1.41<R1/R2<2.98$.

16. The optical lens assembly according to claim 1, wherein a focal length of the third lens is f3, a central thickness of the third lens along the optical axis is CT3, and the following condition is satisfied: $1.62\ mm<(f3*CT3)/f<2.90\ mm$.

17. The optical lens assembly according to claim 1, wherein a focal length of the optical lens assembly is f, a curvature radius of the object-side surface of the sixth lens is R11, and the following condition is satisfied: $1.06<f/R11<2.03$.

18. The optical lens assembly according to claim 1, wherein a central thickness of the first lens along the optical axis is CT1, a central thickness of the second lens along the optical axis is CT2, a distance from the image-side surface of the first lens to the object-side surface of the second lens along the optical axis is T12, a distance from the image-side surface of the second lens to the stop along the optical axis is T2S, and the following condition is satisfied: $0.83<(CT1+T12+CT2+T2S)/EPD<1.59$.

19. The optical lens assembly according to claim 1, wherein a central thickness of the first lens along the optical axis is CT1, a central thickness of the second lens along the optical axis is CT2, a central thickness of the third lens along the optical axis is CT3, a central thickness of the fourth lens along the optical axis is CT4, a central thickness of the fifth lens along the optical axis is CT5, and the following condition is satisfied: $2.37<(CT3+CT4+CT5)/(CT1+CT2)<5.08$.

* * * * *